United States Patent [19]

Selinko

[11] Patent Number: 4,993,973

[45] Date of Patent: Feb. 19, 1991

[54] BATTERY CONTACT

[75] Inventor: George J. Selinko, Lighthouse Point, Fla.

[73] Assignee: Motorola, Inc., Schaumburg, Ill.

[21] Appl. No.: 439,054

[22] Filed: Nov. 20, 1989

[51] Int. Cl.$^5$ ............................................. H01R 19/00
[52] U.S. Cl. ..................................... 439/627; 429/96; 429/100; 439/620
[58] Field of Search .................. 439/627, 620; 429/96, 429/97, 98, 99, 100

[56] References Cited

U.S. PATENT DOCUMENTS

| | | | |
|---|---|---|---|
| 3,999,110 | 12/1976 | Hamstrom et al. | 429/96 |
| 4,129,688 | 12/1978 | Fischer et al. | 429/97 |
| 4,371,594 | 2/1983 | Ohara et al. | 429/97 |
| 4,786,889 | 11/1988 | Hayasaka | 340/311.1 |
| 4,863,812 | 9/1989 | Veda et al. | 429/100 |

FOREIGN PATENT DOCUMENTS

| | | | |
|---|---|---|---|
| 2854118 | 6/1979 | Fed. Rep. of Germany | 429/100 |
| 0044667 | 3/1983 | Japan | 429/96 |

Primary Examiner—David L. Pirlot
Attorney, Agent, or Firm—William E. Koch; Vincent B. Ingrassia

[57] ABSTRACT

A housing for receiving an energy source having first and second ends. The housing has a chamber for receiving the energy source in a first direction, a first contact positioned in the chamber and coupled to the housing for electrically contact the first end of the energy source, and retaining means rotatably positioned in the chamber for securing the energy source. The retaining means incorporates a second electrical contact for contacting the second end of the energy source. The chamber is sealed by a retractable door that encloses the chamber, first contact, and the retaining means.

12 Claims, 2 Drawing Sheets

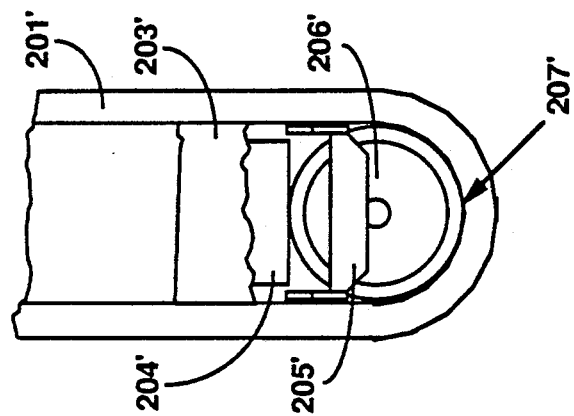
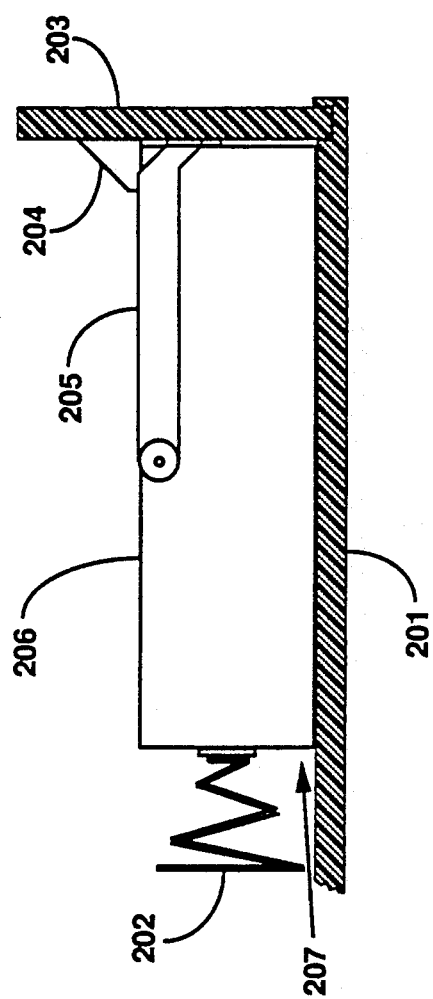
FIG. 2B
FIG. 2A

BATTERY CONTACT

FIELD OF THE INVENTION

This invention relates in general to electrical contacts and more particularly to battery contacts used in portable electronic devices.

BACKGROUND OF THE INVENTION

Portable electronic devices typically use a primary or secondary energy storage medium (battery) to derive power necessary for operation. A contacting scheme is required to connect the energy source with the electronic circuitry in the electronic device.

Many attempts have been made to design a contacting scheme that will provide reliable electrical contact during all modes of operation. An example of a more demanding mode is when the electronic device has been dropped. Any movement of the battery during the shock and vibration created by the impact of drop that causes a loss of power (the physical battery connection is broken), will cause unpredictable device operation, or in the case of a device with volatile memory circuits, a total loss of the memory's contents.

An important point which must be considered in the case of a miniature electronic device is that the mass of the battery is a majority of the total mass of the device. This creates problems in the design of a system to effectively retain the battery in a constant position during operation in all possible orientations and modes.

In general, the battery is located in a cylindrical chamber formed within the device's housing. To contact a AA battery, present embodiments require that conductive contacts be placed at opposite ends of the cylindrical chamber at or near the axis of the cylinder. Using conventional contacting methods, a conductive coil or flat leaf spring that compresses when the battery is inserted is situated at one end of the chamber. The spring force exerted by the contact acts to retain the battery against an opposing contact which is typically located on a sliding battery door. By using the sliding battery door for one of the contacts, the number of contact interfaces is increased to three. Interfaces are located between the spring terminal and battery, battery door and circuit board contact, and the battery door and battery.

The design objective for an optimal contacting scheme always dictates that the number of contact interfaces should be minimized. Following this objective will give a design with improved reliability as compared with a design having more interfaces.

Another problem with using the battery door to retain and contact the battery is that the spring loading, when applied to the battery door, will increase the stress and strain that must be supported by the battery door and its associated mounting hardware. This increased stress and strain will eventually lead to the deformation of the battery door and intermittent electrical contact performance.

Thus, what is needed is a means for reliably contacting an energy source used to power an electronic device.

SUMMARY OF THE INVENTION

Accordingly, it is an object of the present invention to provide an improved apparatus for reliably contacting an energy source.

In carrying out the above and other objects of the invention in one form, there is provided a housing for receiving an energy source having first and second ends. The housing has a chamber for receiving the energy source in a first direction, a first contact positioned in the chamber and coupled to the housing for electrically contacting the first end of the energy source, and retaining means rotatably positioned in the chamber for securing the energy source. The retaining means incorporates a second electrical contact for contacting the second end of the energy source. The chamber is sealed by a retractable door that encloses the chamber, first contact, and the retaining means.

BRIEF DESCRIPTION OF THE DRAWINGS

FIG. 2A is a side view of a battery after installation in accordance with the preferred embodiment.

FIG. 2B is an end view of a battery after installation in accordance with the preferred embodiment.

DETAILED DESCRIPTION OF THE INVENTION

Figure 1B:
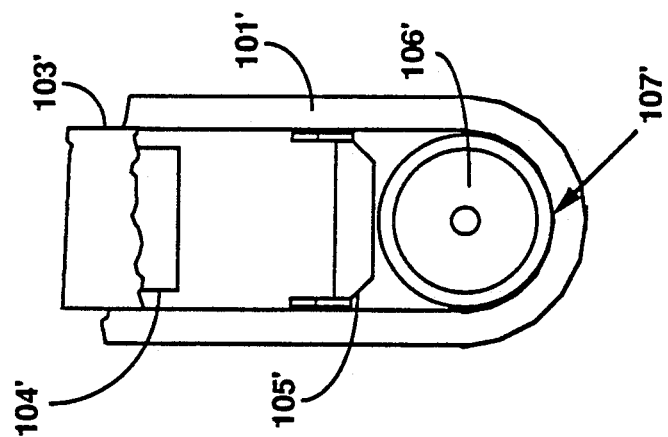
FIG. 1B is an end view of a battery being installed in accordance with the preferred embodiment.
Figure 1A:
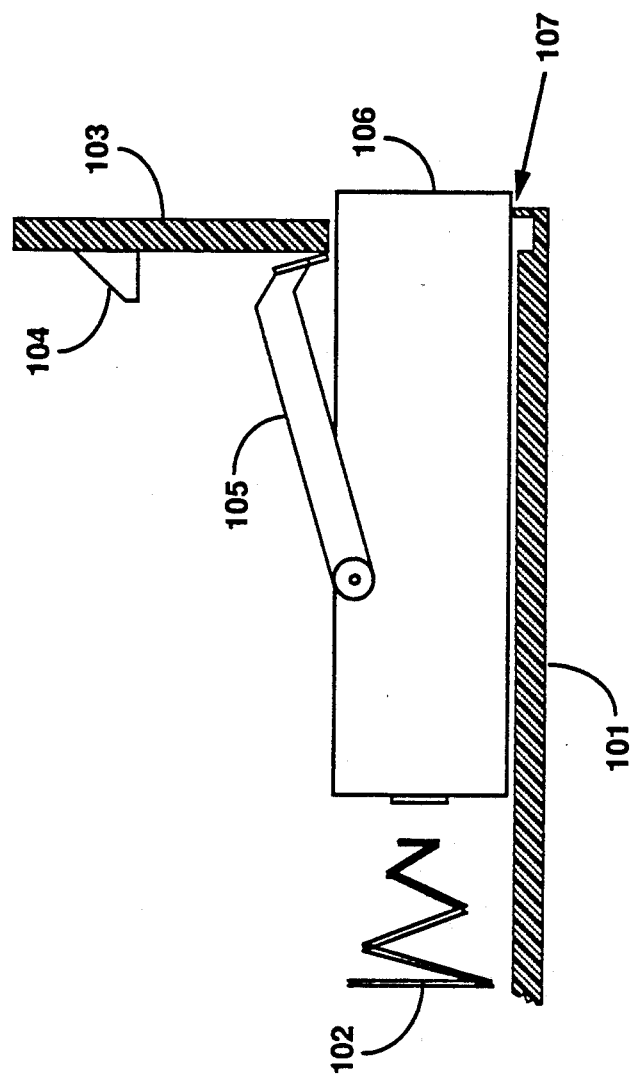
FIG. 1A is a side view of a battery being installed in accordance with the preferred embodiment.

Referring to FIG. 1A and 1B, the preferred embodiment of the battery contacting system comprises a housing 101, 101', spring contact 102, battery compartment door 103, 103', blocking pad 104, 104', rotatable contact 105, 105', and energy source (battery) 106, 106'.

The battery 106, 106' is shown being inserted in a first direction into a chamber 107, 107' formed by the housing 101, 101'. It can be appreciated by those skilled in the art that the chamber 107, 107' may be formed as an integral part of the housing 101, 101' or as a separate entity that can attach to the housing 101, 101' or a component (e.g. a printed circuit board) affixed within the housing 101, 101'. The door 103, 103' and rotatable contact 105, 105' have been moved to their open positions, thus exposing the opening of the chamber 107, 107' and allowing insertion of the battery 106, 106'. The battery is inserted until the end closest to the door 103, 103' clears the end of the rotatable contact 105, 105'. During insertion of the battery 106, 106', the spring contact 102 is compressed. The spring contact 102 shown is a conically tapered coil spring formed from a spring tempered conductive metal such as phosphor-bronze or beryllium-copper. Alternately, the spring contact 102 may be constructed in the form of a leaf spring or one of many other spring contact structures that are well known to those skilled in the art. When fully inserted, the battery 106, 106' will transfer the force exerted by the spring contact 102 to the rotatable contact 105, 105'.

Referring to FIG. 2A and 2B, the preferred embodiment of the battery contacting system comprises a housing 201, 201', spring contact 202, battery compartment door 203, 203', blocking pad 204, 204', rotatable contact 205, 205', and energy source (battery) 206, 206'.

The battery 206, 206' is shown locked into position in the chamber 207, 207'. The door 203, 203' and rotatable contact 205, 205' have been moved to their closed positions, thus sealing the opening of the chamber 207, 207' and securing the battery 206, 206'. In this embodiment, the rotatable contact 205, 205' is coupled to the door 203, 203' (not shown for clarity) such that when the door 203, 203' is closed the rotatable contact 205, 205' will pivot over the exposed end of the battery 206, 206' securing it. It is not necessary to couple the rotatable contact 205, 205' with the door 203, 203', but this makes the embodiment much easier to operate.

As can be seen from the drawing, this embodiment can be easily modified to accommodate multiple batteries if needed to power the portable device. With the battery 206, 206' fully inserted, the force exerted by the spring contact 202 is transferred to the rotatable contact 205, 205' by the battery 206, 206'. This force, along with the force exerted by the blocking pad 204, 204', provides a positive means for retaining the battery 206, 206' in a stationary position and insuring good electrical contact between the battery terminals and the spring 202 and rotatable contact 205, 205'. Because no force parallel to the direction of battery 206, 206' insertion is exerted on the door 203, 203', the likelihood of the door 203, 203' opening or breaking as a result of the shifting of the battery's 206, 206' mass during an impact is greatly decreased if not totally eliminated. Another advantage to the contacting system shown is that when the battery 206, 206' varies in length, the spring contact 202 will serve to "take up" the variance and still insure a good electrical connection.

I claim:

1. A housing for receiving an energy source having first and second ends comprising:
   a chamber for receiving said energy source in a first direction;
   a first contact positioned in said chamber and coupled to said housing for applying a force in a direction substantially opposite to said first direction when electrically contacting said first end of said energy source.
   retaining means having a second electrical contact for contacting said second end of said energy source said retaining means being rotatably positioned in said chamber and coupled to said housing for securing said energy source in said chamber and to prevent said force from being applied to a door means, and
   said door means for enclosing said chamber, said first contact, and said retaining means.

2. The housing according to claim 1 wherein said first contact comprises a spring mechanism substantially opposite to said first directional.

3. The housing according to claim 1 wherein said first contact is positioned such that a third contact on said energy source will align with said first contact to provide an electrical connection when said energy source is inserted into said housing.

4. The housing according to claim 1 wherein said retaining means comprises a member having said second electrical contact.

5. The housing according to claim 4 wherein said member is capable of being rotatably positioned in an orientation that places a conductive area of said second electrical contact substantially perpendicular to said first direction to provide an electrical connection between said second electrical contact and a fourth contact on said energy source when said energy source is secured in said housing.

6. The housing according to claim 1 wherein said door means comprises a moveably mounted cover having a blocking pad.

7. The housing according to claim 6 wherein said blocking pad serves to prevent said energy source from moving in a direction substantially perpendicular to said first direction once said door has been closed.

8. An apparatus capable of housing an energy source comprising:
   first means for housing said energy source, said first means providing a chamber for receiving said energy source in a first direction;
   second means for contacting said energy source, said second means having a first contact positioned at a first end of said chamber for applying a force to said energy source in a direction substantially opposite that of said first direction; and a
   third means rotatably coupled to said first means for securing said energy source within said chamber, said third means having a second contact for contacting said energy source and for preventing said force from being applied to fourth means; and
   said fourth means for selectively enclosing said chamber said fourth means including a blocking pad for preventing said third means from rotating when said forth means encloses said chamber.

9. The apparatus according to claim 8 wherein said first and second contacts provide a path comprised of an electrically conductive medium for the conduction of electric currents to an electric powered device.

10. The apparatus according to claim 8 wherein said fourth means comprising a door.

11. The apparatus according to claim 10 wherein said door is detachably mounted to said housing.

12. A housing for receiving an energy source having first and second ends, comprising:
   a chamber for receiving said energy source in a first direction;
   a first contact positioned in said chamber and coupled to said housing for applying a force in a direction substantially opposite to said first direction when electrically contacting said first end of said energy source; and
   retaining means having a second electrical contact for contacting said second end of said energy source, said retaining means being rotatably positioned in said chamber and coupled to said housing for securing said energy source in said chamber, and for preventing said force from being applied to a door means for enclosing said energy source within said chamber.

* * * * *